(12) United States Patent
Fritzemeier et al.

(10) Patent No.: US 6,475,311 B1
(45) Date of Patent: Nov. 5, 2002

(54) ALLOY MATERIALS

(75) Inventors: Leslie G. Fritzemeier, Acton, MA (US); Cornelis Leo Hans Thieme, Westborough, MA (US); Elliott D. Thompson, Coventry, RI (US)

(73) Assignee: American Superconductor Corporation, Westborough, MA (US)

( * ) Notice: Subject to any disclaimer, the term of this patent is extended or adjusted under 35 U.S.C. 154(b) by 0 days.

(21) Appl. No.: 09/283,775

(22) Filed: Mar. 31, 1999

(51) Int. Cl.[7] .................................................. C22F 1/10
(52) U.S. Cl. ...................... 148/677; 148/676; 148/668
(58) Field of Search ................................. 420/428, 442; 148/427, 423, 677, 676, 668

(56) References Cited

U.S. PATENT DOCUMENTS

| | | |
|---|---|---|
| 1,823,938 A | 9/1931 | Henke |
| 2,585,613 A * | 2/1952 | Allen ........................... 148/13 |
| 2,739,907 A | 3/1956 | Nowak et al. ............... 117/106 |
| 3,109,331 A | 11/1963 | Cordray et al. ................. 80/60 |
| 3,615,917 A | 10/1971 | Shin et al. .................... 148/111 |
| 3,648,355 A | 3/1972 | Shida et al. ................ 29/471.7 |
| 3,692,596 A * | 9/1972 | Fraser et al. ............... 148/31.5 |
| 3,700,427 A | 10/1972 | Hoppin, III et al. .......... 75/5 R |
| 3,713,211 A | 1/1973 | Freeman, Jr. ................. 29/599 |
| 3,770,497 A | 11/1973 | Hëssler et al. .............. 117/212 |
| 3,778,237 A | 12/1973 | Shapiro et al. ................ 29/199 |
| 3,845,543 A | 11/1974 | Roth et al. ................. 29/472.3 |
| 3,982,973 A * | 9/1976 | Peters et al. .................. 148/32 |
| 4,024,617 A | 5/1977 | McCormick ............. 29/156.63 |
| 4,105,828 A | 8/1978 | Borchert et al. ............. 428/665 |
| 4,145,481 A | 3/1979 | Gupta et al. ................. 428/678 |
| 4,148,973 A * | 4/1979 | Sexton et al. ............... 428/680 |
| 4,246,321 A | 1/1981 | Shibata ....................... 428/614 |
| 4,283,225 A * | 8/1981 | Sexton et al. ................. 75/170 |
| 4,367,102 A | 1/1983 | Wilhelm ..................... 148/133 |
| 4,416,916 A | 11/1983 | Aykan et al. ............... 427/160 |

(List continued on next page.)

FOREIGN PATENT DOCUMENTS

| | | |
|---|---|---|
| CA | 967916 | 11/1994 |
| DE | 19501223 A1 | 1/1995 |
| EP | 0 392 659 A3 | 3/1990 |
| EP | 0 410 373 A2 | 7/1990 |
| EP | 0 312 015 1 | 12/1992 |
| EP | 0 341 788 B1 | 8/1993 |
| JP | 1-100818 | 4/1989 |
| JP | 1-100820 | 4/1989 |
| JP | 05025565 | 2/1993 |
| JP | 06279944 | 3/1993 |
| JP | 6-139848 | 5/1994 |
| WO | WO 96/32201 | 10/1996 |

OTHER PUBLICATIONS

ASM Handbook vol. 2: Properties and Selection: Nonferrous Alloys and Special–Purpose Materials, ed. by Davis et al, pub. by ASM International, 1992, p. 436.*

Goler and Sachs, Zeitschrift fur Physik, vol. 59, pp. 485–494 (1929) (German Version).

(List continued on next page.)

Primary Examiner—Melvyn Andrews
Assistant Examiner—Harry D. Wilkins, III
(74) Attorney, Agent, or Firm—Fish & Richardson P.C.

(57) ABSTRACT

An alloy having a cube textured substrate is disclosed. The alloy includes two different metals. The alloy can be used as a substrate for a superconductor. Optionally, one or more buffer layers can be disposed between the substrate and the superconductor material. The alloy can be prepared using a process that includes rolling the alloy and annealing the alloy. The alloy can have a relatively large volume percent that is formed of grains with cube texture.

14 Claims, 5 Drawing Sheets

| 100 | |
|---|---|
| 101 | SELECT AND WEIGH THE CONSTITUENT METALS |
| 102 | MELT THE CONSTITUENTS AND COOL |
| 103 | REMELT TO ENHANCE HOMOGENEITY |
| 104 | SHAPE THE SOLIDIFIED MELT AND REDUCE IN SIZE TO FURTHER HOMOGENIZE |
| 105 | MECHANICALLY DEFORM THE SHAPE TO A SMALLER SIZE AND RECRYSTALLIZE TO FORM A SMALL GRAIN SIZE |
| 106 | DEFORMING THE SHAPE IN AN AXIALLY SYMMETRIC MANNER TO A SMALLER SIZE. |
| 107 | PLANAR DEFORM THE ALLOY TO A REDUCTION IN THICKNESS OF BETWEEN 85% TO 99.9% |
| 108 | HEAT TREAT AT A TEMPERATURE EXCEEDING 250°C BUT NOT MORE THAN 95% OF THE MELTING TEMPERATURE |

U.S. PATENT DOCUMENTS

| | | |
|---|---|---|
| 4,431,462 A | 2/1984 | Gould et al. ............ 148/11.5 Q |
| 4,537,642 A | 8/1985 | Saito et al. ............. 148/11.5 Q |
| 4,578,320 A | 3/1986 | Mahulikar et al. ........... 428/674 |
| 4,640,816 A | 2/1987 | Atzmon et al. ................ 419/24 |
| 4,749,628 A | 6/1988 | Ahlert et al. ................ 428/660 |
| 4,788,082 A | 11/1988 | Schmitt .................... 427/248.1 |
| 4,909,859 A | 3/1990 | Nazmy et al. .......... 148/11.5 N |
| 4,917,967 A | 4/1990 | Cupolo et al. ............... 428/669 |
| 4,927,788 A | 5/1990 | Nakashima et al. ......... 439/887 |
| 4,939,308 A | 7/1990 | Maxfield et al. ................ 505/1 |
| 4,980,341 A | 12/1990 | Gehring ......................... 505/1 |
| 4,990,492 A | 2/1991 | Creedon et al. ................ 505/1 |
| 4,994,435 A | 2/1991 | Shiga et al. .................... 505/1 |
| 4,994,633 A | 2/1991 | Puhn ....................... 174/125.1 |
| 5,006,507 A | 4/1991 | Woolf et al. .................... 505/1 |
| 5,019,552 A | 5/1991 | Balooch et al. ................. 505/1 |
| 5,047,389 A | 9/1991 | Woolf et al. .................... 505/1 |
| 5,057,489 A | 10/1991 | Ohkawa et al. ................. 505/1 |
| 5,059,582 A | 10/1991 | Chung ............................ 505/1 |
| 5,063,200 A | 11/1991 | Okada et al. ................... 505/1 |
| 5,074,907 A | 12/1991 | Amato et al. ................. 75/235 |
| 5,089,057 A | 2/1992 | Plewes ...................... 148/12.7 |
| 5,102,865 A | 4/1992 | Woolf et al. .................... 505/1 |
| 5,108,982 A | 4/1992 | Woolf et al. .................... 505/1 |
| 5,110,790 A | 5/1992 | Feenstra et al. ................ 505/1 |
| 5,114,087 A | 5/1992 | Fisher et al. ................... 242/42 |
| 5,118,663 A | 6/1992 | Woolf et al. .................... 505/1 |
| 5,123,586 A | 6/1992 | Woolf et al. ................. 228/124 |
| 5,147,849 A | 9/1992 | Tanaka et al. .................. 505/1 |
| 5,149,681 A | 9/1992 | Ohkawa et al. ................. 505/1 |
| 5,149,684 A | 9/1992 | Woolf et al. .................... 505/1 |
| 5,164,360 A | 11/1992 | Woolf et al. .................... 505/1 |
| 5,198,043 A | 3/1993 | Johnson ...................... 148/512 |
| 5,200,391 A | 4/1993 | Fisher et al. ................... 505/1 |
| 5,204,313 A | 4/1993 | Lelental et al. ................. 505/1 |
| 5,206,216 A | 4/1993 | Yoshida .......................... 505/1 |
| 5,212,148 A | 5/1993 | Roas et al. ..................... 505/1 |
| 5,225,031 A | 7/1993 | McKee et al. .............. 156/612 |
| 5,231,074 A | 7/1993 | Cima et al. ..................... 505/1 |
| 5,238,752 A | 8/1993 | Duderstadt et al. ......... 428/623 |
| 5,240,905 A | 8/1993 | Tanaka et al. .................. 505/1 |
| 5,248,662 A | 9/1993 | Yoshida et al. ................. 505/1 |
| 5,256,205 A | 10/1993 | Schmitt, III et al. ........ 118/723 |
| 5,258,364 A | 11/1993 | Yamazaki ...................... 505/1 |
| 5,270,294 A | 12/1993 | Wu et al. ....................... 505/1 |
| 5,273,959 A | 12/1993 | Lambert et al. ............... 505/1 |
| 5,290,761 A | 3/1994 | Keating et al. ................. 505/1 |
| 5,312,804 A | 5/1994 | Petibon et al. ............. 505/434 |
| 5,330,966 A | 7/1994 | Hayashi et al. ............. 505/473 |
| 5,340,792 A | 8/1994 | Ovshinsky et al. ......... 505/123 |
| 5,356,672 A | 10/1994 | Schmitt, III et al. ........ 427/446 |
| 5,356,673 A | 10/1994 | Schmitt et al. ............. 427/446 |
| 5,360,784 A | 11/1994 | Kimura et al. .............. 505/433 |
| 5,372,089 A | 12/1994 | Yoshida et al. ............... 117/98 |
| 5,378,683 A | 1/1995 | Cabanel et al. ............. 505/190 |
| 5,379,019 A | 1/1995 | Fiddes et al. ................ 335/216 |
| 5,426,092 A | 6/1995 | Ovshinsky et al. ......... 505/461 |
| 5,427,866 A | 6/1995 | Nagaraj et al. .............. 428/610 |
| 5,432,151 A | 7/1995 | Russo et al. ................ 505/474 |
| 5,434,130 A | 7/1995 | Hikata et al. ............... 505/433 |
| 5,439,877 A | 8/1995 | Face .......................... 505/475 |
| 5,470,668 A | 11/1995 | Wu et al. .................... 428/688 |
| 5,482,578 A | 1/1996 | Rose et al. .................. 148/516 |
| 5,516,484 A | 5/1996 | Kubosono et al. ........... 420/469 |
| 5,527,765 A | 6/1996 | Hodge et al. ............... 505/236 |
| 5,545,612 A | 8/1996 | Mizushima et al. ........ 505/239 |
| 5,571,332 A | 11/1996 | Halpern ...................... 118/723 |
| 5,629,268 A | 5/1997 | Tanaka et al. .............. 505/329 |
| 5,645,893 A | 7/1997 | Rickerby et al. ........... 427/405 |
| 5,648,321 A | 7/1997 | Bednorz et al. ............ 505/473 |
| 5,650,378 A | 7/1997 | Iijima et al. ................. 505/473 |
| 5,660,746 A | 8/1997 | Witanachchi et al. ... 219/121.66 |
| 5,667,663 A | 9/1997 | Rickerby et al. ........... 205/170 |
| 5,672,569 A | 9/1997 | Nakamura et al. .......... 505/330 |
| 5,693,140 A | 12/1997 | McKee et al. ............... 117/108 |
| 5,696,392 A | 12/1997 | Char et al. ................... 257/190 |
| 5,703,341 A | 12/1997 | Lowndes et al. ....... 219/121.66 |
| 5,739,086 A | 4/1998 | Goyal et al. ................. 505/473 |
| 5,741,377 A | 4/1998 | Goyal et al. ................. 148/512 |
| 5,872,081 A | 2/1999 | Woolf ......................... 505/450 |
| 5,964,966 A * | 10/1999 | Goyal et al. ................. 148/426 |
| 5,968,877 A | 10/1999 | Budai et al. ................. 505/237 |
| 6,022,832 A * | 2/2000 | Fritzemeier et al. ........ 505/461 |
| 6,027,564 A | 2/2000 | Fritzemeier et al. |

OTHER PUBLICATIONS

Goler and Sachs, Zeitschrift fur Physik, vol. 59, pp. 485–494 (1929) (English Translation).

Detert et al., Zeitschrift fur Metallkunde, vol. 54, pp. 263–270 (1963) (German Version).

Detert et al., Zeitschrift fur Metalkunde, vol. 54, pp. 263–270 (1963) (English Translation).

Goler and Sachs, Zeitschrift fur Physik, vol. 59, pp. 477–484 (1929) (German Version).

Goler and Sachs, Zeitschrift fur Physik, vol. 59, pp. 477–484 (1929) (English Translation).

Dillamore and Roberts, Metallurgic Reviews vol. 10, pp. 271–377 (1965).

Baxter et al., "Artifacts in Transmission Electron Microscope Images of Artificially Layered Metallic Superlattices," *Applied Physics Letters 48*: 1202–1204 (1986).

Brick et al., "Effects of Various Solute Elements on the Hardness and Rolling Textures of Copper," *Transactions of the A.S.M.* 31:675–699 (1943).

Budai et al., "In–Plane Epitaxial Alignment of $Yba_2Cu_3O_{7-x}$ Films Grown on Silver Crystals and Buffer Layers," *Appl. Phys. Letter. 62*: 1836–1838 (1993).

Christen et al., "Transport Critical Currents in Epitaxial $Y1Ba_2Cu_3O_{7-x}$ Thin Films," Proceedings of International Conference on Materials and Mechanisms of Superconductivity High–Temperature Superconductors, Stanford, CA (Jul. 1989).

Dionne et al., "Magnetic and Stress Characterization of Nickel Ferrite Ceramic Films Grown by Jet Vapor Deposition,".

Doi et al., "A New Type of Superconducting Wire; Biaxially Oriented T11 $(Ba0 8Sr0.2)2$ $Ca2Cu3O9$ on [100] <100> Textured Silver Tape," *Advances in Superconductivity VII*, 817–820.

Eom et al., "Frequency Stabilization of a 612 nm He–Ne Laser in a Transverse Magnetic Field," *Appl. Phys. Lett. 57*: 739–740 (1990).

Feldman et al., "Epitaxial Growth of A15 Nb3Si," *IEEE Transactions on Magnetics 1*: 545–548 (1981).

Ginsbach et al., "Electrical and Structural Properties of Yba2Cu3O7 Films on PO and Single Crystalline Oxides of Cu and $Ni_2$," *Physica* 185–189: 2111–2112 (1991).

Ginsbach et al., "Growth of C–Axis Oriented YbaCuO Films on Oxidized Textured Ni Sheets and on (100) and (110) Oriented NiO Single Crystals," *IEEE Transactions on Magnetics 27*: 1410–1413 (1991).

Goyal, A., "Advances in Processing High–Tc Superconductors for Bulk Applications," *JOM* 11 (1994).

Goyal, A., "Progress Toward Bulk Application of High–Tc Superconductors," *JOM* 55 (1995).

Goldbacker et al., "Biaxially Textured Substrate Tapes of Cu, Ni, Alloyed Ni, (Ag) for YBCO Films," Applied Superconductivity, The Netherlands, Jun. 30, 1997.

Norton et al., "Yba2Cu3)7–x Thin Film Growth on Single Crystal and Polycrystalline Yttria–Stabilized Zirconia," Conference on Science and Technology of Thin–Film Superconductors, Apr. 1990.

Norton et al., "Superconducting Transport Properties and Surface Microstructure for Yba2Cu3O7–8–Based Superlattices Grown by Pulsed Laser Deposition," Workshop on Laser Ablation Mechanism and Applications, May 1991.

Norton et al., "Epitaxial Yba2Cu3O7 on Biaxially Textured Nickel (001): An Approach to Superconducting Tapes with High Critical Current Density," Science 274: 755–757 (1996).

Sadakata et al., "Preparation of Aligned High Tc Superconducting composite Tape by Laser Deposition Process on Metallic Substrate," Symposium on Superconductor Stability, Yokohama, Japan, Nov. 13–15, 1990.

Schlom et al., "Origin of the Φ□±9° Peaks in Yba2Cu3O7–8 Films Grown on Cubic Zicronia Substrates," H13.49, p. 272.

Budai et al., "In–Plane Alignment of YbaCuO Films on Metal Substrates and Buffer Layers,"H13.52, p. 272.

Smallman et al., "Advances in the Theory of Deformation and Recrystallization Texture Formation," *Materials Science and Engineering A184*: 97–112 (1994).

Yoshida et al., "Y–Ba–Cu–O Films Grown on Flexible Polycrystalline Substrates by Excimer Laser Ablation," Advances in Superconductivity III, Proceedings of the $3^{rd}$ International Symposium on Superconductivity (ISS '90), Nov. 6–9, 1990, Sendai.

Yoshino et al., "Improvement of In–Plane Aligment of Grains in YBCO Films on Ag Tapes," Advances in Superconductivity VI, pp. 759–762.

Undated Report, JVD Process Nickel Ferrite, Date unavailable.

Final Report dated Apr. 22, 1996.

* cited by examiner

| | |
|---|---|
| 100 | |
| 101 | SELECT AND WEIGH THE CONSTITUENT METALS |
| 102 | MELT THE CONSTITUENTS AND COOL |
| 103 | REMELT TO ENHANCE HOMOGENEITY |
| 104 | SHAPE THE SOLIDIFIED MELT AND REDUCE IN SIZE TO FURTHER HOMOGENIZE |
| 105 | MECHANICALLY DEFORM THE SHAPE TO A SMALLER SIZE AND RECRYSTALLIZE TO FORM A SMALL GRAIN SIZE |
| 106 | DEFORMING THE SHAPE IN AN AXIALLY SYMMETRIC MANNER TO A SMALLER SIZE. |
| 107 | PLANAR DEFORM THE ALLOY TO A REDUCTION IN THICKNESS OF BETWEEN 85% TO 99.9% |
| 108 | HEAT TREAT AT A TEMPERATURE EXCEEDING 250°C BUT NOT MORE THAN 95% OF THE MELTING TEMPERATURE |

FIG. 1

ALLOY MATERIALS

BACKGROUND OF THE INVENTION

The invention relates to alloys that can be used as substrates for superconductors, to superconductors including such substrates, and to methods of making these alloys and superconductors.

Superconductors, including oxide superconductors, are used in a variety of applications. Some superconductors can demonstrate limited mechanical strength. Often, the mechanical strength of a superconductor can be enhanced by forming a multilayer article that includes a layer of superconductor material and a substrate layer, but the substrate should exhibit certain properties.

The substrate should have a low Curie temperature so that the substrate is not ferromagnetic below the superconductor's critical temperature. Furthermore, chemical species within the substrate should not be able to diffuse into the layer of superconductor material, and the coefficient of thermal expansion of the substrate should be about the same as or somewhat higher than the superconductor material. Moreover, if the substrate is used for an oxide superconductor, the substrate material should be relatively resistant to oxidation.

For some materials, such as $YBa_2Cu_3O_x$ (YBCO), the ability of the material to act as a superconductor depends upon the crystallographic orientation of the material. For these superconductors, the substrate should have a crystallographic orientation that allows the material to act as a superconductor. Often, good superconducting properties are observed in these materials when the substrate has a biaxially textured surface. One type of biaxial texture is cube texture, in which the lattice is oriented such that the cube texture, in which the lattice is oriented such that the cube face is parallel to the surface. In addition, the cube edge in each crystallite is parallel to the cube edge in all neighboring crystallites. Examples of cube textured surfaces include the (100)[001] and (100)[011] surfaces, and an example of a biaxially textured surface is the (113)[211] surface.

Some substrates do not readily meet all these requirements, so one or more buffer layers can be disposed between the substrate and the superconductor layer. The buffer layer(s) can be comparatively resistant to oxidation, and reduce the diffusion of chemical species between the substrate and the superconductor layer. Moreover, the buffer layer(s) can have a coefficient of thermal expansion and a crystallographic orientation that is well matched with the superconductor material.

Buffer layers are commonly formed using epitaxy. An epitaxial layer is a layer of material that is grown on a surface such that the crystallographic orientation of the layer of material is determined by the lattice structure of the surface on which the layer is grown. For example, for an epitaxial buffer layer grown on the surface of a substrate layer, the crystallographic orientation of the epitaxial layer is determined by the lattice structure of the surface of the substrate layer. Techniques used to grow epitaxial buffer layers include chemical vapor deposition and physical vapor deposition.

Some pure metals, such as copper and nickel, can be prepared to have a desirable crystallographic orientation (e.g, a biaxial texture or cube texture) by a process that involves first rolling the metal and then annealing the metal. However, these pure metals may exhibit certain properties that are inappropriate for a substrate. For Attempts have been made to provide substrates for superconductors that are crystallographically oriented alloys. These substrates have been formed by first rolling and annealing a metal, then diffusing a different metal into the pure metal to form the alloy. This can result in a nonhomogeneous alloy.

SUMMARY OF THE INVENTION

The invention relates to alloys that can be used as substrates for superconductors, to superconductors including such substrates, and to methods of making these alloys and superconductors. The alloys can exhibit a variety of advantages, including good oxidation resistance, low Curie temperature, good homogeneity, and/or good surface texture.

In one aspect, the invention features a substantially homogeneous alloy including nickel and chromium. The alloy has a cube texture surface. At least about 65 volume percent of the alloy has a cube texture. The alloy can be made by a process that includes rolling the alloy, and then annealing the alloy.

In another aspect, the invention features an article that includes a substrate and a layer. The substrate is formed of a substantially homogeneous alloy including nickel and chromium. The alloy has a cube texture surface, and the layer is supported by the cube texture surface. The alloy can be made by a process that includes rolling the alloy, and then annealing the alloy.

The alloys preferably have a Curie temperature of less than about 80 K (e.g., less than about 40 K or less than about 20 K).

The alloys can be homogeneous alloys.

The alloys can be relatively resistant to oxidation.

The alloys can have a surface that is biaxially textured or cube textured.

A relatively large volume percent of the alloys can be cube textured.

BRIEF DESCRIPTION OF THE DRAWINGS

FIG. 1 is a block diagram illustrating the process of forming a cube-textured alloy substrate.

DESCRIPTION OF THE EMBODIMENTS

Figure 2:
FIG. 2 illustrates a partial cross-sectional view of a superconductor composite formed with a cube-textured alloy substrate.

The invention relates to alloys that can be used as substrates for superconductors. The alloys have a cube textured surface and include a first metal and a second metal that is different than the first metal. The alloys can include additional metals, or the alloys can include only the first and second metals (i.e., no more than trace amounts of any other metals).

Examples of metals from which the first and second metals can be selected include copper, nickel, chromium, vanadium, aluminum, silver, iron, palladium, molybdenum, gold and zinc.

Generally, the alloys include from about 5 atomic percent to about 45 atomic percent of the first metal (e.g., from about 10 atomic percent to about 40 atomic percent).

In one embodiment, the alloy includes chromium as the first metal and nickel as the second metal. If the amount of chromium is too small, the Curie temperature of the alloy may be too high for use as a superconductor substrate. However, if the amount of chromium is too large, the alloy may not be able to form a biaxial or cube textured surface. Preferably, the alloy contains nickel and at most about 20 atomic percent chromium (e.g., from about 5 atomic percent to about 18 atomic percent chromium or from about 10 atomic percent to about 15 atomic percent chromium).

In another embodiment, the alloy includes nickel as the first metal and copper as the second metal. If the amount of copper is too low, the Curie temperature of the alloy may be too high. However, if the amount of copper is too high, there may not be a good lattice match with the superconductor material. Preferably, the alloy contains nickel and from about 5 atomic percent to about 45 atomic percent copper (e.g., from about 10 atomic percent to about 40 atomic percent copper or from about 25 atomic percent to about 35 atomic percent copper).

Preferably, the alloy has a biaxially textured surface (e.g., a (113)[211] surface), more preferably a cube textured surface (e.g., a (100)[001] surface or a (100)[011] surface).

In some superconductors (e.g., YBCO), the critical current density can depend upon the grain boundary angle. For example, the presence of annealing twins, which are narrow regions inside and/or across a grain having a high angle grain boundary with biaxial or cube texture grains, can result in a region with poor electrical current transport. The region in which an annealing twin is present can effectively be closed for superconducting currents.

To minimize the effect of annealing twins, the volume percent of the alloy having grains with biaxial texture is preferably at least about about 65 volume percent (e.g., at least about 80 volume percent or at least about 85 volume percent) as measured using X-ray diffraction pole figures.

In certain embodiments, the volume percent of the alloy with grains having a cube texture is preferably at least about 65 volume percent (e.g., at least about 80 volume percent or at least about 85 volume percent) as measured using X-ray diffraction pole figures.

Preferably, the peaks in an X-ray diffraction pole figure of the alloy have a Full Width Half Maximum (FWHM) less than about 20° (e.g., less than about 15°, less than about 10° or from about 5° to about 10°).

The alloy preferably has a Curie temperature of less than about 80 K (e.g., less than about 40 K or less than about 20 K).

The alloy is preferably homogeneous. The amount by which the concentration of constituents in the alloy varies across the cross section of the alloy is preferably less than about 15 percent (e.g, less than about five percent or less than about two percent).

The preferred alloys can be used as a substrate for a superconductor. The superconductor material can be disposed directly onto a surface of the substrate, or one or more buffer layers can be disposed between the substrate and the superconductor material.

Examples of superconductor materials include oxide superconductor materials, such as yttrium-barium-copper-oxides, rare earth barium copper oxides, and mixtures of these two classes, wherein the YBCO yttrium is partially or completely replaced by rare earth elements such as lanthanum, cerium, praseodymium, neodymium, samarium, europium, gadolinium, terbium, dysprosium, holmium, erbium, thulium, ytterbium, lutetium and thorium. Other possible superconductor oxides include the mercury, bismuth, and thallium families. The superconductor material can be applied by any of a variety of methods, including electroplating, non-vacuum solution deposition, chemical vapor deposition, physical vapor deposition techniques such as sputtering, laser ablation, thermal evaporation, electron beam evaporation, metallorganic and/or sol-gel solution precursor methods.

A preferred precursor approach uses a metallorganic triflouroacetate precursor solution. With this approach, high temperature superconductor films are spun or dip coated onto substrates and then reacted to form the superconducting YBCO phase. The as-coated precursor includes an oxy-fluoride film containing $BaF_2$. Heat treatment in a controlled atmosphere, such as that disclosed in U.S. Pat. No. 5,231,074 issued to Cima, et al., fully incorporated herein by reference, decomposes the $BaF_2$ phase and thereby crystallizes the film. This allows the nucleation and growth of an epitaxial YBCO film. Superconductor oxide films characterized by highly textured morphologies and fully dense, homogenous microstructures are capable of sustaining critical current densities in excess of $10^4$ A/cm$^2$ at 77 degrees Kelvin when prepared on non-lattice matched substrates, and critical current densities in excess of $10^6$A/cm$^2$ at 77 degrees Kelvin when prepared on lattice matched substrates.

Preferably, the superconductor material has a thickness of from about 0.2 micrometers to about 20 micrometer (e.g., from about 1 micrometer to about 20 micrometers).

The superconductor material can be deposited directly onto a surface of the alloy substrate, or onto a buffer layer that is disposed on a surface of the alloy substrate. One or more buffer layers can be disposed between the alloy substrate and the superconductor material. The buffer layer can be formed using any of the standard techniques, including epitaxial deposition (e.g., chemical vapor deposition or physical vapor deposition), or by growing a native oxide of the alloy via exposure of the alloy to an environment containing sufficient oxygen. This native oxide can be grown epitaxially. Thus, the native oxide can have a biaxially textured surface (e.g., a (113)[211] surface), or a cube textured surface (e.g., a (100)[001] surface or a (100)[011] surface). Methods of epitaxially depositing buffer layers are disclosed in commonly assigned U.S. patent applications Ser. No. 09/007,375, filed Jan. 15, 1998, now U.S. Pat. No. 6,007,564, Ser. No. 09/007,367, now U.S. Pat. No. 6,022,832, filed Jan. 15, 1998, Ser. No. 09/007,372, filed Jan. 15, 1998, now abandoned and Ser. No. 09/007,373, filed Jan. 15, 1998, now abandoned all of which are hereby incorporated by reference in their entirety.

Examples of buffer layers include noble metals, alloys of noble metals and oxides, such as oxides with a cubic structure (e.g, MgO, $Al_2O_3$, yttria, YSZ, $SrTiO_3$, $LaAlO_3$, $YAlO_3$ or rare earth oxides such as $CeO_2$, $Yb_2O_3$, or yttria-stabilized zirconia (YSZ)). By "noble metal" is meant a metal which is thermodynamically stable under the reaction conditions employed relative to the desired superconductor material, and/or which does not react with the superconductor material or its precursors under the conditions of manufacture of the superconductor. A noble metal can be a metal different from the metallic matrix elements of the desired superconducting ceramic. A noble metal can be silver or a silver/gold alloy, but it can also be a stoichiometric excess of one of the metallic elements of the desired superconducting ceramic, such as yttrium. Silver (Ag) and silver alloys are the most preferred noble metals. Other noble metals which can be used are platinum, gold, palladium, rhodium, iridium, ruthenium, rhenium, rhenium or alloys thereof. Suitable oxides such as MgO, cubic $Al_2O_3$, yttria, YSZ, or rare earth oxides such as $CeO_2$, $Yb_2O_3$ etc. or mixtures of these are typically stable oxides with a cubic structure. These materials can be used alone or in combination.

The total thickness of the buffer layer(s) is preferably from about 0.05 micrometers to about 10 micrometers (e.g., from about 0.2 to about 0.8 micrometers).

In certain embodiments, the superconductor is a multilayer structure including a textured (e.g., biaxially textured or cube textured) substrate, on which a textured (e.g., biaxially textured or cube textured) epitaxial buffer layer is disposed, and onto which a textured (e.g., biaxially textured or cube textured) epitaxial superconducting layer is disposed. In these embodiments, more than one textured epitaxial buffer can be disposed between the textured epitaxial and the textured substrate.

The buffer layer and/or superconducting layer can be on one side or both sides of the substrate, and can partially or entirely surround the substrate.

A cap layer (e.g., a metal cap layer) can be provided on top of the superconducting layer. Materials that can be used in the cap layer include noble metals and alloys of noble metals, which can be complemented with an additional layer of a less noble metal such as copper or aluminum to reduce cost.

The alloys can be formed by creating a homogenous solid solution of the alloying elements. The constituents of the alloy are weighed, mixed, and melted together to form an alloy. The melt is then cooled to room temperature. The rate of cooling can be slow or fast, with a rapid quench preferred for giving a fine grain size. The solidified alloy is further homogenized by a heat treatment. The alloy is then processed into tape by mechanical means, such as rolling, after which a suitable heat treatment produces the desired cube texture. An optional recrystallization step after the homogenization and partial deformation of the alloy induces a refined grain size of, for example, from about 5 micrometers to about 70 micrometers, which obtains a cube texture in the rolled and heat treated tapes.

Referring to FIG. 1, a block diagram illustrates the process 100 for forming a cube-textured alloy. The constituent metals (Step 101) are selected, weighed and mixed.

The solid solution is melted (Step 102) by various processes known in the art, such as arc melting, induction melting, plasma torch melting, or melting in an electrical resistance furnace or a furnace heated by gas or coal. Melting temperatures range, for example, from about 1100° C. to about 1250° C. A certain level of homogenization is achieved during the melt process due to convection, mechanical stirring, or stirring induced by the melting techniques such as the induction melter. The melting can be performed in air, under vacuum, or under a protective inert atmosphere, such as nitrogen, argon or helium.

The melting can be repeated several times to further increase homogenization (Step 103).

The melt is cooled with the furnace. The solidified melt is shaped, preferably, into a bar. The bar is reduced in diameter by rod rolling, swaging, drawing or extrusion (e.g., by a factor of from about 1.3 to about 5) and heat treated to further homogenize the alloy (Step 104).

A further mechanical reduction in diameter by similar mechanical means follows, to a size where the planar deformation process will commence (Step 105). Before or at this stage a heat treatment can be applied to recrystallize the alloy and obtain a fine grain size of (e.g., from about 5 micrometers to 70 micrometers or from about 10 micrometers to about 40 micrometers) (also Step 105). Alternatively, other methods can be utilized to achieve a fine grain size, such as the rapid solidification of the alloy after melting. An example is the atomization of a melt into an alloy powder, which is subsequently consolidated by (hot) pressing or extrusion into a bar, and which is processed subsequently similar to a cast alloy. The alloy sample is subsequently deformed in an axially symmetric manner, such as extrusion, swaging, drawing, or rod rolling to a smaller size which can be round, square or rectangular (Step 106). In yet another alternate process step, the melt can be cast and rolled. This cast can be further homogenized with a suitable heat treatment, rolled to a thinner size, and recrystallized to induce a fine grain size.

The alloy is deformed further by various planar rolling methods known in the art (Step 107), to reduce the thickness of the stock by, for example, at least about 85% and up to about 99.8%. The planar deformation is performed at temperatures between, for example, −200° C. and 600° C., and preferably at room temperature.

A recrystallization anneal (Step 108) at a temperature exceeding about 250° C., but not more than 95% of the melting temperature, and preferably at temperatures between 400 and 1190° C., produces the desired single cube texture (100)[001].

Figure 6:
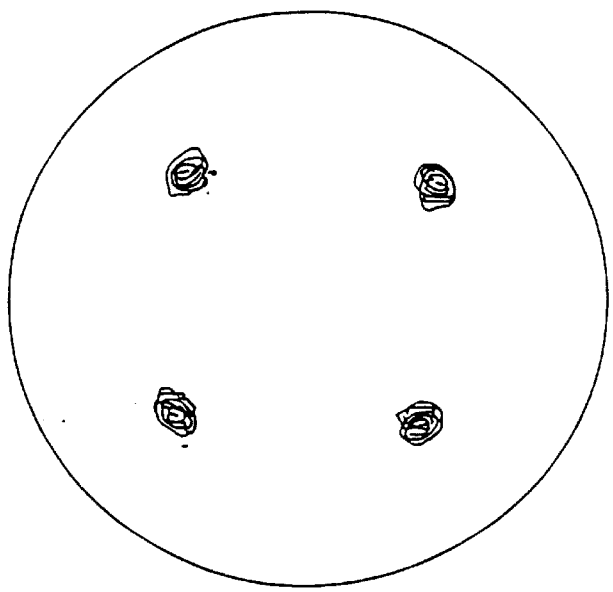
FIGS. 6–9 are pole figures of cube-textured alloys.

FIG. 6 shows a (200) and a (111) pole figure, of a Cu-26.5% Ni alloy. A single and high quality (100)[001] cube texture is shown. This alloy was made by extrusion of the homogenized alloy to tape, rolling the tape to a reduction in thickness of 96%, and heat treating the final tape at 850° C. for 4 hours in a protective atmosphere. (See Example 3).

Rolling is typically performed at room temperature, with rolling between, for example, about 0.10 meters per minute and about 100 meters per minute. The reduction schedule can be a constant reduction per pass, or a varied reduction per pass, with reduction steps chosen to be, for example, between about 5% and 40% per pass. The tape can be lubricated during rolling, or rolled without any lubricant. The tapes can be rolled with various size rolls, including large diameter rolls (e.g., from about 3.5" to about 8" or larger in diameter) or preferably with small diameter rolls (e.g., from about 0.75" to about 2" in diameter) which can be backed up by larger rolls, in a so-called four-high arrangement. Alternatives to the four-high arrangement are cluster and planetary rolling mills.

Referring to FIG. 2, a partial cross section of a superconducting composite 200 is shown. To form a superconducting composite 200, the above described substrates 201 of cube-textured alloys have at least one surface 202 coated with a superconducting oxide 203, such as yttrium-barium-copper-oxide (YBCO) or a rare earth barium copper oxide (REBCO) or mixtures of these. The REBCO's are formed by partial or complete substitution of yttrium (Y) in the YBCO with rare earth elements such as neodymium, samarium, europium, gadolinium, terbium, dysprosium, holmium, erbium, thulium, ytterbium, lutetium, lanthenum, cerium, or praesodium. The coating of the superconducting oxide 203 is preferably from about 0.2 micrometers to about 10 micrometers thick, more preferably from about 1 micrometer to about 10 micrometers thick. The coating is applied by any deposition technique, such as a non-vacuum solution deposition, electroplating, chemical vapor deposition, or physical vapor deposition techniques, such as sputtering, laser ablation, thermal evaporation, electron beam evaporation. These deposition techniques can require a heat treatment, such as that disclosed in U.S. Pat. No. 5,231,074 issued to Cima et al., fully incorporated herein by reference, to form the YBCO in an epitaxial manner, and optimize its superconducting properties.

Figure 3:
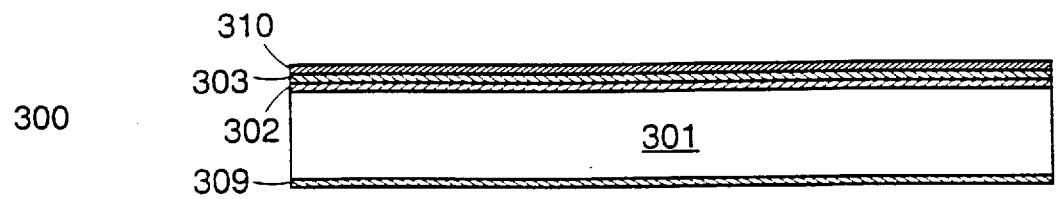
FIG. 3 illustrates a partial cross-sectional view of a superconductor composite formed with a cube-textured alloy substrate and a textured buffer layer.

FIG. 3 shows a different superconductor structure 300, having a substrate 301, a buffer layer (or multiple buffer layers) 302, and a layer of superconductor material 303. Any of the deposition processes listed above, among others, can be used for depositing the buffer layer 302. A heat treatment can be included to form the buffer layer in an epitaxial manner (e.g., by forming a native oxide of the alloy).

Figure 3A:
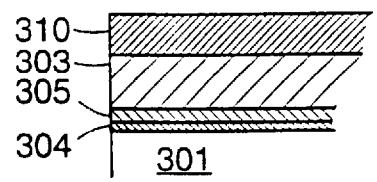
FIGS. 3A and 3B illustrate partial cross-sectional views of superconductor composites formed with multiple buffer layers.

A structure in which the buffer layer has two layers is shown in FIG. 3A where the substrate 301 is covered with a buffer layer 304 and subsequently a second buffer layer 305, where the combination of layers 304 and 305 form the buffer layer. The multiple buffer layers 304 and 305 can include any combination of layers, such as a metal layer 304 with an oxide layer 305 on top, or an oxide layer 304 with another oxide layer 305 on top.

Figure 3B:
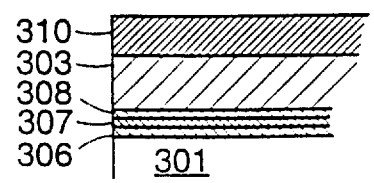

Alternatively, referring to FIG. 3B, the buffer layer can include three or even more layers. In this arrangement, the substrate 301 is coated with a metal or oxide buffer layer 306 which in turn is coated with additional metal or oxide buffer layers 307 and 308 before deposition of the superconducting layer 303.

FIG. 3 shows a substrate with this optional buffer layer 309 on the bottom side of the substrate. As shown in FIG. 3, superconductor structure 300 can optionally include a cap layer 310.

Figure 4:
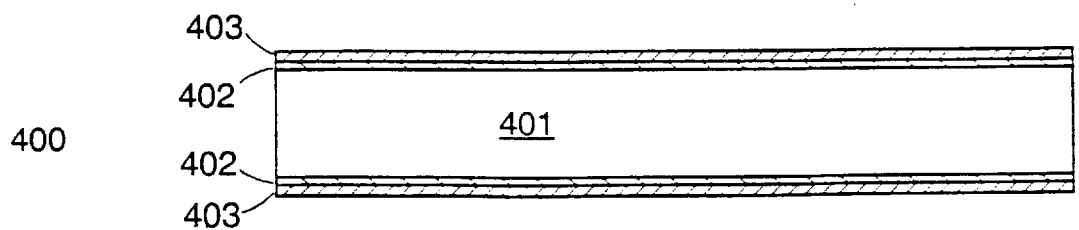
FIG. 4 illustrates a partial cross-sectional view of a superconductor composite having both sides coated with a buffer layer and a superconducting layer.

Referring to FIG. 4, there is shown a partial cross section of a superconducting composite 400. In this embodiment, the composite 400 has a substrate 401 with a pair of surfaces that are each coated with a buffer layer 402. A superconducting oxide 403 is coated on each of the buffer layers 402.

Figure 5:
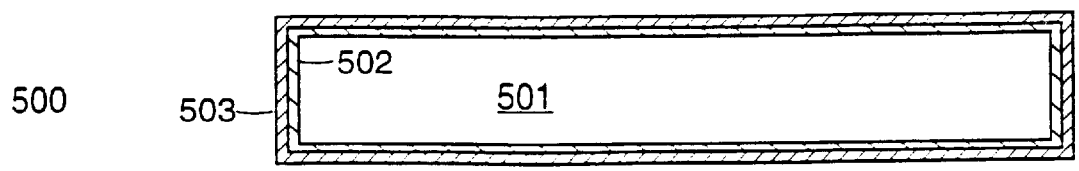
FIG. 5 illustrates a cross-sectional view of a superconductor composite in which the coated layers surround the substrate.

In an alternate arrangement, as shown in FIG. 5, the composite 500 has a substrate 501 which is fully surrounded by a buffer layer 502. Furthermore, a superconducting oxide layer 503 fully coats the buffer layers 502 on all surfaces of the composite 500.

Other alloys that can be used as substrates for superconductors, superconductors including such substrates, and methods of making these substrates and superconductors are disclosed in commonly assigned U.S. patent applications Ser. No. 09/283,777, filed on even date herewith and entitled "Alloy Materials", Ser. No. 08/943,047, filed Oct. 1, 1997, and Ser. No. 08/942,038, filed Oct. 1, 1997 are hereby incorporated by reference in their entirety.

EXAMPLE 1

Figure 7:
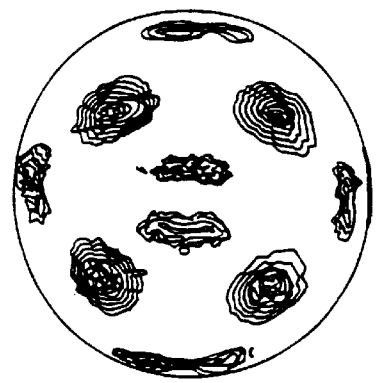

A cube-textured copper-nickel alloy was produced as follows. Ni and Cu pieces (pellets mixed with coarse powders) were weighed in a ratio of 68 at % Cu and 32 at % Ni. The pieces were mixed and loaded in a water cooled copper hearth of an arc melter which operates under a protective atmosphere. The Cu and Ni mixture was melted and solidified several times, to ensure adequate mixing, at a temperature well above the melting temperatures for several minutes. The solidified and cooled alloy was mechanically formed in the shape of a solid cylinder, and was swaged to a smaller diameter of approximately 3 mm. No homogenization anneal was applied in this example. Subsequently, the swaged cylinder was rolled, using 10% deformation per pass, to a total reduction of 98% without any intermediate stress anneal process. The resulting tape was heat treated at 850° C. for 4 hrs using a protective gas of 95% argon and 5% hydrogen. This tape showed mainly a single, bi-axial cube texture, which can be seen in the {111} pole figure of FIG. 7.

EXAMPLE 2

Figure 8:
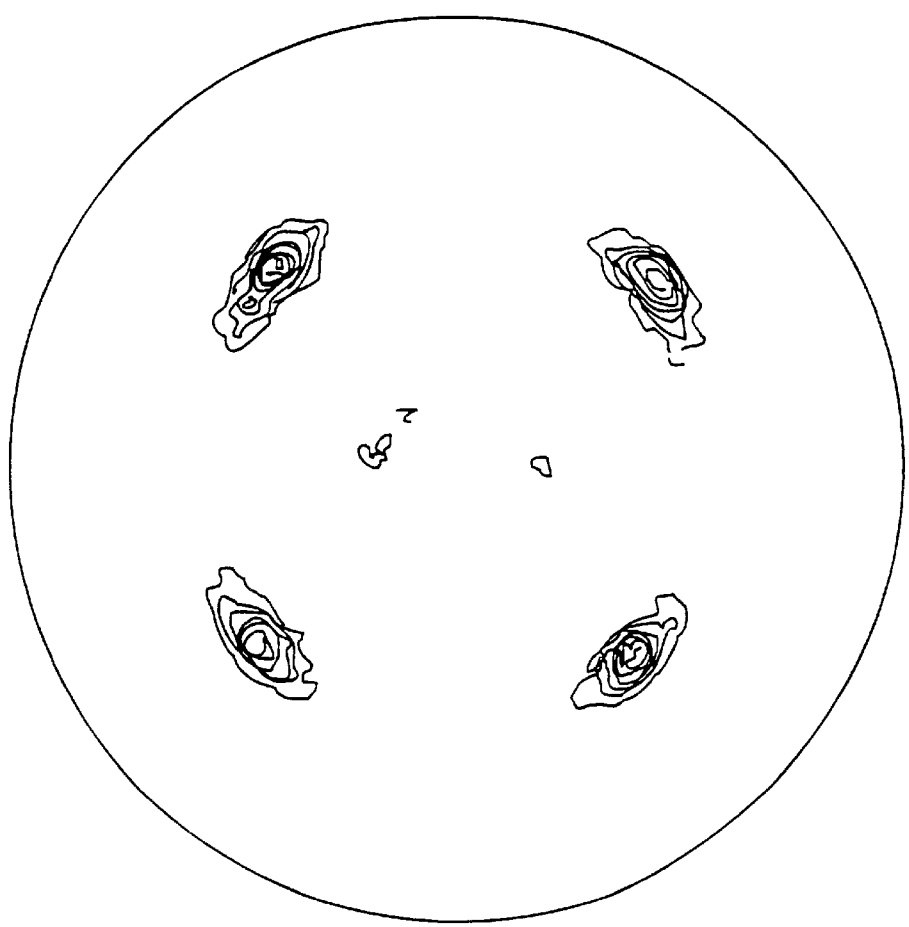

A 32 mm diameter oxygen free copper can was loaded with a mixture of Cu and Ni pieces, and the overall exact stoichiometry (including the weight of the copper can) was further adjusted with Cu powder, to a mixture of 16 at % Ni, 84 at % Cu. This can was placed inside a 38 mm diameter thin-walled alumina crucible and heated under vacuum using a ALLOY MATERIALS induction melter at about 1170° C., for up to 5 minutes. After solidification, the alloy was removed from the crucible. To enhance homogeneity, the cast was remelted using a similar crucible and the same induction melter, again under a protective atmosphere and at the same conditions. The cast alloy, which had a cylindrical shape, was machined to a diameter of 31 mm and swaged to a 17 mm diameter bar. This bar was homogenized at 950° C. for 8 hrs. It was machined to a 16 mm diameter billet, suitable for hydrostatic extrusion. It was extruded to a 3 mm diameter ire and subsequently rolled using a reversible direction rolling technique, with a four-high rolling mill at a rolling speed of 6 m/min, and reduction per pass of 10%. The total reduction in thickness is 98.8%. Subsequently, it was heat treated at 850° C. for 4 hrs under a 95% argon—5% hydrogen gas mixture. This tape had a single bi-axial cube texture and a FWHM value of 9°. A {111} and {200} pole figure is shown of this alloy in FIG. 8. The pole figures demonstrate a single, high quality cube texture.

EXAMPLE 3

A similar process was followed as in Example 2, but the mixture was 26.5 at % Ni and 73.5 at % Cu. The alloy was extruded to a tape, which was rolled to a reduction in thickness of 96%. The tape was heat treated for 4 hours at 850 degrees Celcius. The final tape made with this alloy had a single bi-axial cube texture. A {111} and {200} pole figure of this alloy is shown in FIG. 6.

EXAMPLE 4

Figure 9:
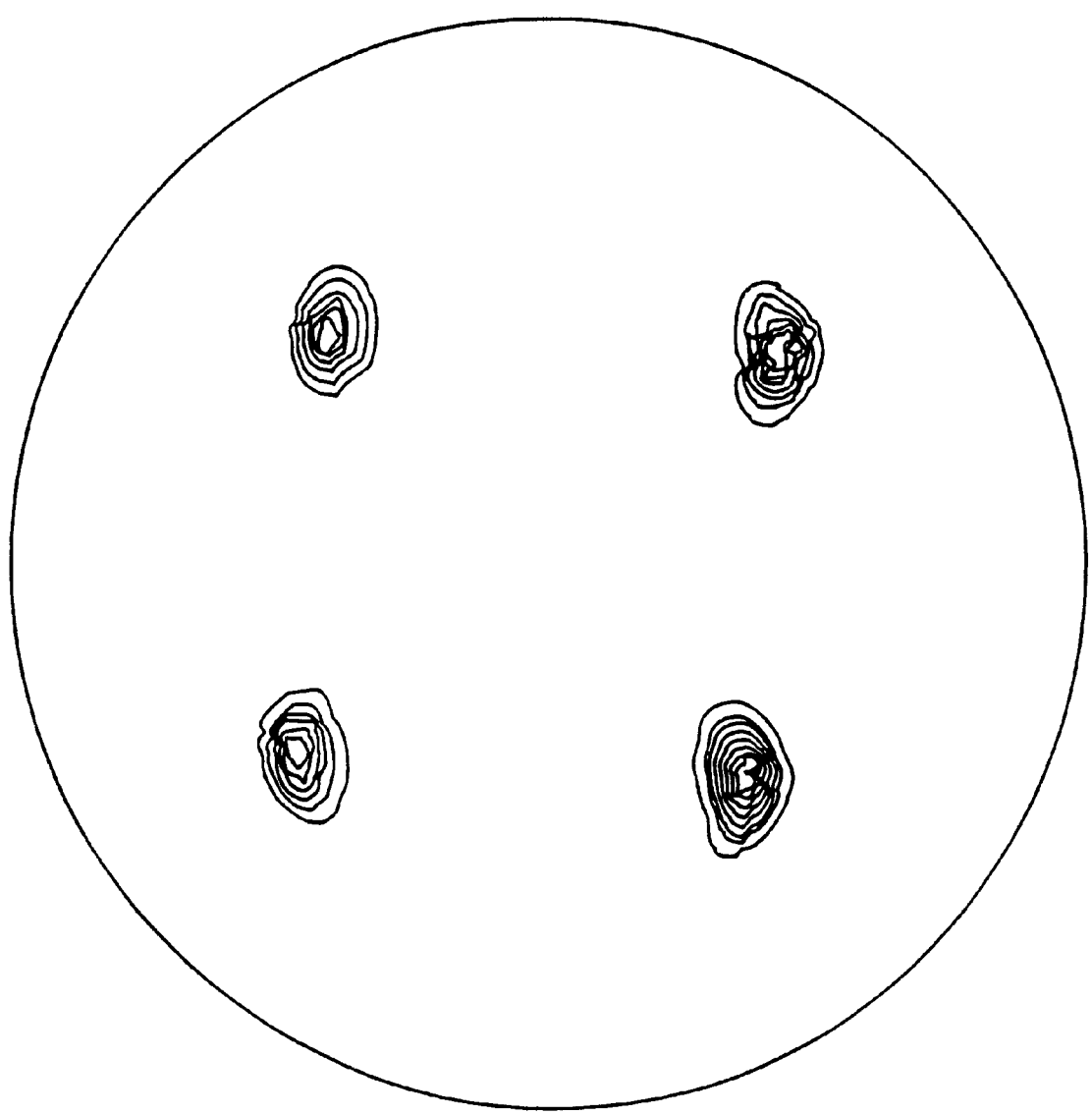

A similar process was followed as in Example 2, but the mixture was 37 at % Ni and 63 at % Cu. The final foil made with this alloy had a single bi-axial (100)[001] cube texture. A {111} and {200} pole figure of this alloy is shown in FIG. 9.

EXAMPLE 5

An 89 atomic percent nickel-11 atomic percent chromium alloy were rolled using 10% deformation per pass, and room temperature deformation. The foils were annealed at 1000° C., and their texture was determined using X-ray pole figures.

Figure 10:
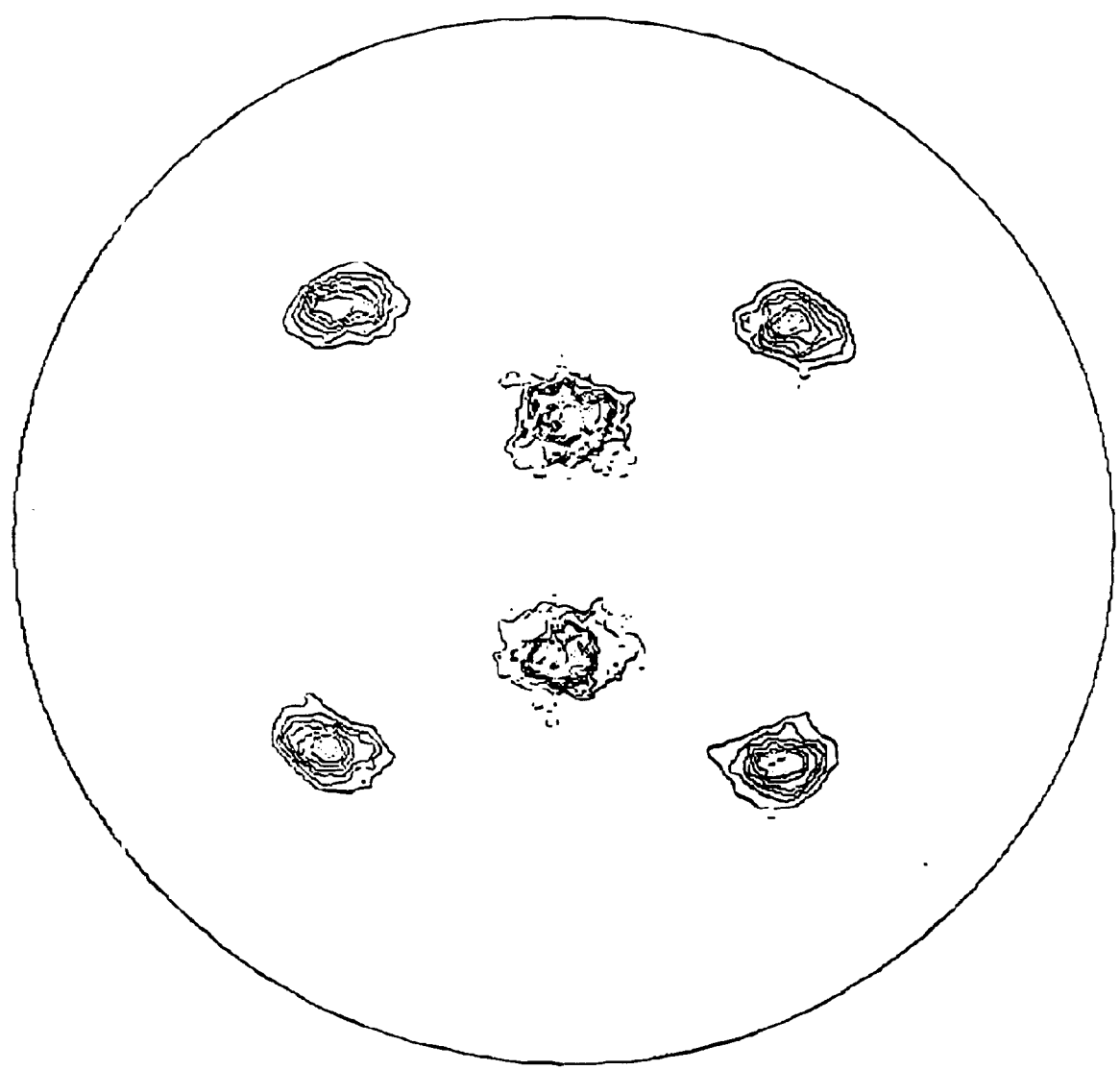
FIG. 10 is a pole figure of a 89 atomic percent nickel-11 atomic percent chromium alloy.

FIG. 10 shows a (111) pole figure for the alloy rolled to 0.1 millimeters, annealed at 1000° C. in 95% Ar/5% $H_2$ for four hours and subsequently polished to a thickness of 0.075 millimeters. A well developed cube texture is shown with some remnant of the rolling texture observable near the center.

Other embodiments are in the claims.

What is claimed is:

1. A method, comprising:

forming a substantially homogeneous alloy comprising nickel and chromium, the alloy having a cube textured surface, wherein at least about 65 volume percent of the alloy comprises grains having a cube texture, and wherein the alloy has an X-ray diffraction pole figure with a full width at half maximum of less than about 20°, wherein the method includes rolling the alloy to obtain the cube texture.

2. The method of claim 1, wherein the method further includes annealing the alloy.

3. The method of claim 2, wherein the alloy is rolled after it is annealed.

4. The method of claim 1, wherein the alloy comprises at most about 20 atomic percent chromium.

5. The method of claim 1, wherein at least about 65% of the area of the surface has a cube texture.

6. The method of claim 1, wherein the alloy has a Curie temperature of at most about 80 K.

7. The method of claim 1, wherein the alloy has a Curie temperature of at most about 40 K.

8. The method of claim 1, wherein the alloy has a Curie temperature of at most about 10 K.

9. The method of claim 1, wherein the full width at half maximum of the X-ray diffraction pole figure is less than about 15°.

10. The method of claim 1, wherein the full width at half maximum of the X-ray diffraction pole figure is less than about 10°.

11. The method of claim 1 wherein the full width at half maximum of the X-ray diffraction pole figure is from about 5° to about 10°.

12. The method of claim 1, wherein a concentration of constituents varies across a cross-section of the alloy by less than about 15 percent.

13. The method of claim 1, wherein a concentration of constituents varies across a cross-section of the alloy by less than about five percent.

14. The method of claim 1, wherein a concentration of constituents varies across a cross-section of the alloy by less than about two percent.

* * * * *